United States Patent Office 3,313,788
Patented Apr. 11, 1967

3,313,788
IMIDAZOLIDINE-2-THIONE DERIVATIVES
Lucien Convert, Thiais, and Raymond Fabre, Vincennes, France, assignors to Rhone-Poulenc S.A., Paris, France, a French corporation
No Drawing. Filed Dec. 31, 1964, Ser. No. 422,527
Claims priority, application France, July 18, 1964, 982,205
7 Claims. (Cl. 260—79.5)

The present invention provides a new group of chemical compounds suitable for vulcanizing mixes of halogenated synthetic elastomers, more especially mixes based on chloroprene polymers.

It is known that these elastomers are simple to vulcanize with metal oxides alone such, for example, as the oxides of zinc, magnesium, and lead, or with mixed such oxides. However, under these conditions vulcanization progresses slowly and is incomplete so that the vulcanizates obtained have unsatisfactory technical properties.

On the other hand, it is known that the use of classic vulcanization accelerators, either by themselves or in mixtures, such as the guanidines and the thiurams, raises the vulcanization speed and improves the characteristic properties of the vulcanizates, but these accelerators are still incapable of achieving the desired level of vulcanization.

Other, more specific accelerators, have been suggested for the vulcanization of mixes containing chloroprene polymers, especially imidazolidine-2-thione, alkylated or cycloalkylated thioureas, triazine derivatives, thiosemicarbazides, thioxamides and cyclic polyamides.

The use of some of these compounds improves the properties of the vulcanizates substantially, but, quite frequently, this is accompanied by a lesser facility and safety in the handling of the mixes prior to vulcanization. Users in fact know very well the tendency of mixes, especially those which contain a thiourea, to undergo pre-vulcanization. Inconveniences of this kind may occur in the course of the diverse operations involved in the processing of the mix prior to vulcanization, and this may sometimes result in very appreciable losses of material.

It has now been found that the derivatives of imidazolidine-2-thione of the general formula:

(I)
$$\begin{array}{cc}
H_2C\text{——}CH_2 & H_2C\text{——}CH_2 \\
R_1\text{—}N\quad N\text{—}CH_2\text{—}N\text{—}A\text{—}N\text{—}CH_2\text{—}N\quad N\text{—}R_2 \\
\quad\diagdown\diagup\qquad\quad |\quad\quad |\qquad\quad\diagdown\diagup \\
\quad C\qquad\qquad R_3\quad R_4\qquad\qquad C \\
\quad \|\qquad\qquad\qquad\qquad\qquad\qquad \| \\
\quad S\qquad\qquad\qquad\qquad\qquad\qquad\quad O
\end{array}$$

where $R_1$ and $R_2$ are identical or different and each represents hydrogen, lower alkyl, cycloalkyl, or hydroxymethyl, A represents a saturated, straight or branched hydrocarbon residue, and $R_3$ and $R_4$ are identical or different and each represents hydrogen, lower alkyl, or cycloalkyl, or —$NR_3$—A—$NR_4$— represents $$\begin{array}{c}
R\quad R \\
|\quad\ | \\
CH\text{—}CH \\
\diagup\qquad\diagdown \\
-N\qquad\quad N- \\
\diagdown\qquad\diagup \\
CH\text{—}CH \\
|\quad\ | \\
R\quad R
\end{array}$$

where the R radicals are hydrogen or methyl, and are not necessarily the same, are accelerators of special value for vulcanizing mixes based on a polychloroprene or a chloroprene copolymer. The lower alkyl radicals referred to contain from 1 to 5 carbon atoms, and include, more especially, the methyl, ethyl, n-propyl, isopropyl, n-butyl or isobutyl radicals. The cycloalkyl radicals are preferably mononuclear cycloalkyl radicals whose ring contains more than 4 carbon atoms, which may be substituted, especially by lower alkyl groups, such as methyl or ethyl. Specifically, there may be mentioned the cyclopentyl, the cyclohexyl and the cyclooctyl radicals. The chain A may be, for example, ethylene, trimethylene, tetramethylene, pentamethylene or hexamethylene.

The most valuable residues of the formula:

$$\begin{array}{c}
R\quad R \\
|\quad\ | \\
CH\text{—}CH \\
\diagup\qquad\diagdown \\
-N\qquad\quad N- \\
\diagdown\qquad\diagup \\
CH\text{—}CH \\
|\quad\ | \\
R\quad R
\end{array}$$

are those derived from piperazine and 2,5-dimethyl-piperazine.

According to a feature of the invention, the compounds of Formula I are prepared by reacting two mols of an imidazolidine-2-thione of formula:

$$\begin{array}{c}
H_2C\text{——}CH_2 \\
R_1\text{—}N\quad NH \\
\diagdown\diagup \\
C \\
\| \\
S
\end{array} \qquad (II)$$

(or mixtures thereof) with one mol of an amine of formula:

$$HNR_3\text{—}A\text{—}R_4NH$$

and two or more mols of formaldehyde. This process may be operated in a variety of ways, as follows:

(1) Two mols of formaldehyde are first reacted with one mol of an amine of the general formula:

$$HNR_3\text{—}A\text{—}R_4NH$$

and the N,N'-di-hydroxymethyl derivative of the said amine obtained is then reacted with two mols of an imidazolidine-2-thione of Formula II or with a mixture of such compounds.

(2) Two mols of formaldehyde are reacted with two mols of the imidazolidine-2-thione of Formula II to form the corresponding N-hydroxymethyl compound and this is then reacted with one mol of an amine of the formula $$HNR_3\text{—}A\text{—}R_4NH$$

(3) When $R_1$ and $R_2$ represent —$CH_2OH$ residues, four mols of formaldehyde are reacted with 2 mols of imidazolidine-2-thione to form the corresponding N,N'-bis(hydroxymethyl) compound, and this is then reacted with one mol of an amine of formula $$HNR_3\text{—}A\text{—}R_4NH$$

The process described above can be performed at room temperature (i.e. about 20° C.) or with moderate heating.

The compound of the Formula I can be used as accelerators for the vulcanization of chloroprene polymers, such as homopolymers of chloroprene and copolymers containing at least 40% of chloroprene residues, and obtained by copolymerizing chloroprene with one or more co-monomers such as acrylonitrile, butadiene, isoprene, dichloro-2,3-butadiene and styrene. The manufacture of chloroprene polymers of this type has been described in various publications, especially in "Synthetic Rubber," John Wiley & Son, Publishers, New York, pp. 767 to 793 [1954].

The new accelerators can be used in amounts depending on the type of polymer to be vulcanized, on the mix to be treated, and on the special result desired. In general an amount ranging from 0.5 to 5 parts per 100 parts by weight of chloroprene polymer is used.

The new accelerators may be used with any usual mix containing a chloroprene polymer. It is known that these compositions generally contain as vulcanizing agents certain metal oxides (e.g. the oxides of zinc, magnesium or lead). It is also possible to add black reinforcing agents and diverse additives, such as peptizing agents, usual or special antioxidants, coloring matter and/or plasticizers.

The incorporation of the accelerator in the mix may be carried out by conventional methods at any stage before the mix reaches the vulcanizing temperature. The handling of the accelerators of this new type is facilitated by the fact that the crude mixes have a thermostability far superior to that of any product used in the past, and this enhanced stability does not in any way affect the vulcanizing speed at the temperature at which vulcanization is carried out, usually 120° to 200° C.

Unvulcanized mixes containing one or more of the compounds of Formula I are within the scope of the invention.

The vulcanizates of this invention possess good general properties. Their surface is perfect, which is not always the case with known accelerators.

The following examples illustrate the invention.

EXAMPLE 1

A round-bottom flask provided with a mechanical stirrer is charged with 204 g. (2 mols) of imidazolidine-2-thione and 2 liters of water, the temperature being 20° C. 180 cc. (2 mols) of a 30% formalin solution are then added gradually within 1 hour. When all has dissolved, a solution of 86 g. (1 mol) of anhydrous piperazine in 550 cc. of water is rapidly added. The batch is heated to 30° C. in the course of 30 minutes and then to 50° C. within 3 hours, then cooled to 20° C. and the solid material formed is isolated, washed and dried under vacuum. Yield: 290 g. (=92.4% of theory).

The product, which melts above 300° C. with decomposition, is identified by analysis as having the following formula:

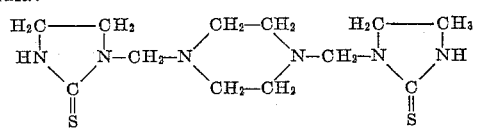

(=product A, used in the following examples).

In the same manner, but replacing piperazine by dimethyl-2,5-piperazine, the compound of the following formula is prepared:

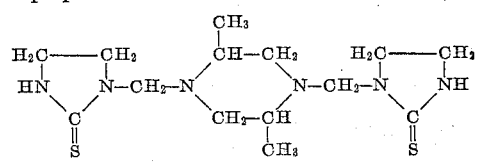

(=product B, used below). This compound likewise melts above 300° C. with decomposition.

EXAMPLE 2

According to the method described in Example 1, but using 360 cc. (4 mols) of 30% formalin per mol of piperazine, the product of the following formula is obtained:

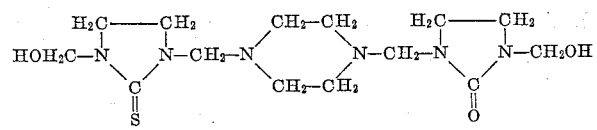

(=product C, used below).

EXAMPLE 3

The following 5 mixes are prepared in a roller mill:

TABLE 1

| Ingredients (parts by weight): | Mix 1 | Mix 2 | Mix 3 | Mix 4 | Mix 5 |
|---|---|---|---|---|---|
| Neoprene W | 100 | 100 | 100 | 100 | 100 |
| Phenyl-α-naphthylamine | 1 | 1 | 1 | 1 | 1 |
| Magnesia | 4 | 4 | 4 | 4 | 4 |
| Zinc oxide | 5 | 5 | 5 | 5 | 5 |
| Imidazolidine-2-thione [1] | | 0.375 | | | |
| Product A | | | 0.58 | | |
| Product B | | | | 0.64 | |
| Product C | | | | | 0.68 |

[1] Known accelerator used for comparison.

Each of these 5 mixes is measured for the scorching time according to Mooney and then vulcanized in moulds in a press at 153° C. The scorching times and properties of the vulcanizes are shown in the following table:

TABLE 2

| Mix | Scorching time according to Mooney at °C.— plus 10 in minutes | | | Vulcanizing time in minutes | Characteristics after vulcanization | | | | |
|---|---|---|---|---|---|---|---|---|---|
| | 121 | 130 | 150 | | Rupture, kg./cm.² | Modulus 600%, kg./cm.² | Elongation in percent | Shore hardness A | Appearance of surface |
| 1 | (a) >60 (b) | | | 20 40 | No vulcanization after 60 minutes | | | | |
| 2 | (a) 15 (b) 13¼ | 10 | 6 | 20 40 | 190 174 | 52 66 | 810 740 | 42 41 | Slightly granular. Do. |
| 3 | (a) 46 (b) 44 | 30 | | 20 40 | 204 189 | 51 73 | 830 725 | 43 47 | Perfect. |
| 4 | (a) 47 (b) 45 | 27½ | | 20 40 | 184 177 | 68 83 | 725 700 | 46 49 | Do. |
| 5 | (a) 43½ (b) | 30¼ | | 20 40 | 200 171 | 42 64 | 885 755 | 42 45 | Do. |

(a) Mooney value immediately after preparing the mix.
(b) Mooney value after 15 days storage.

EXAMPLE 4

The following 5 mixes are prepared under the usual conditions in a Banbury internal mixer, the accelerators being added afterwards in a roller mixer.

TABLE 3

| Ingredients (parts by weight): | Mix 1 | Mix 2 | Mix 3 | Mix 4 | Mix 5 |
|---|---|---|---|---|---|
| Neoprene W | 100 | 100 | 100 | 100 | 100 |
| Stearic acid | 0.5 | 0.5 | 0.5 | 0.5 | 0.5 |
| Black (Semi-reinforcing, furnace) | 29 | 29 | 29 | 29 | 29 |
| Magnesia | 4 | 4 | 4 | 4 | 4 |
| Zinc oxide | 5 | 5 | 5 | 5 | 5 |
| Imidazolidine-2-thione | | 1 | | | |
| Product A | | | 1.55 | | |
| Product B | | | | 1.70 | |
| Product C | | | | | 1.82 |

Each of these 5 mixes is measured for the scorching time according to Mooney and then vulcanized in moulds in a press at 153° C. The scorching times and properties of the vulcanizates are shown in the following table:

TABLE 4

| Mix | Scorching time according to Mooney in minutes at ° C. | | | Vulcanizing time in minutes | Characteristics after vulcanization | | | |
|---|---|---|---|---|---|---|---|---|
| | 110 | 121 | 130 | | Rupture, kg./cm.² | Modulus 200%, kg./cm.² | Elongation in percent | Shore hardness A |
| 1 | (a) | 58 | 40 | 20 | | | | |
| | | | | 40 | 129 | 37 | 620 | |
| 2 | (a) 17 | 9½ | 6½ | 20 | 204 | 70 | 405 | 63 |
| | | | | 40 | 208 | 83 | 360 | 63 |
| 3 | (a) | 24½ | 15½ | 20 | 212 | 70 | 490 | 62 |
| | | | | 40 | 210 | 84 | 390 | 64 |
| 4 | (a) | 18¾ | 12 | 20 | 201 | 80 | 415 | 64 |
| | | | | 40 | 202 | 85 | 370 | 62 |
| 5 | (a) | 19¼ | 12¾ | 20 | 204 | 56 | 480 | 61 |
| | | | | 40 | 203 | 74 | 390 | 62 |

(a) Mooney value immediately after preparing the mix.

EXAMPLE 5

The following 5 mixes are prepared under the usual conditions in a Banbury internal mixer, the accelerators being incorporated afterwards in a roller mixer.

TABLE 5

| | Mix | | | | |
|---|---|---|---|---|---|
| | 1 | 2 | 3 | 4 | 5 |
| Ingredients (parts by weight): | | | | | |
| Neoprene W | 100 | 100 | 100 | 100 | 100 |
| Stearic acid | 0.75 | 0.75 | 0.75 | 0.75 | 0.75 |
| Black (fine, thermal) | 70 | 70 | 70 | 70 | 70 |
| Black (easy processing channel) | 20 | 20 | 20 | 20 | 20 |
| Octylphthalate | 15 | 15 | 15 | 15 | 15 |
| Magnesia | 4 | 4 | 4 | 4 | 4 |
| Zinc oxide | 5 | 5 | 5 | 5 | 5 |
| Imidazolidine-2-thione | | 1 | | | |
| Product A | | | 1.55 | | |
| Product B | | | | 1.70 | |
| Product C | | | | | 1.82 |

Each of these 5 mixes is measured for the scorching time according to Mooney and then vulcanized in a mould in a press at 153° C. The scorching time and the properties of the vulcanizates are shown in the following table:

TABLE 6

| Mix | Scorching time according to Mooney plus 10 in minutes at ° C. | | | Vulcanizing time in minutes | Characteristics after vulcanization | | | |
|---|---|---|---|---|---|---|---|---|
| | 110 | 121 | 130 | | Rupture, kg./cm.² | Modulus 200%, kg./cm.² | Elongation in percent | Shore hardness A |
| 1 | (a) 86 | 35 | | 20 | 32 | 20 | 525 | 59 |
| | (b) | | | 40 | 78 | 29 | 490 | 60 |
| 2 | (a) 13 | 9¼ | 6 | 20 | 155 | 103 | 290 | 68 |
| | (b) 11 | | | 40 | 155 | 107 | 275 | 69 |
| 3 | (a) 39 | 24¼ | 15½ | 20 | 156 | 104 | 260 | 68 |
| | (b) | 22 | | 40 | 155 | 110 | 225 | 69 |
| 4 | (a) | 18¾ | 12¾ | 20 | 156 | 104 | 235 | 68 |
| | (b) | | | 40 | 160 | 112 | 230 | 69 |
| 5 | (a) | 12 | 8¾ | 20 | 165 | 102 | 265 | 67 |
| | (b) | | | 40 | 160 | 105 | 225 | 68 |

(a) Mooney value immediately after preparing the mix.
(b) Mooney value after 15 days storage.

We claim:
1. A compound of the formula:

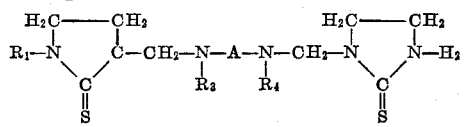

where $R_1$ and $R_2$ each selected from the class consisting of hydrogen, lower alkyl, cycloalkyl and hydroxymethyl, A represents a saturated hydrocargon residue, and $R_3$ and $R_4$ are each selected from the class consisting of hydrogen, lower alkyl, and cycloalkyl, and —$NR_3$—A—$NR_4$— may additionally represent

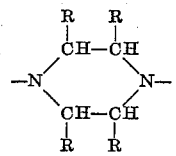

where the R radicals are each selected from the class consisting of hydrogen and methyl.

2. A compound as claimed in claim 1, in which $R_1$ and $R_2$ are each selected from the class consisting of hydrogen and hydroxymethyl, and —$NR_3$—A—$NR_4$— is selected from the class consisting

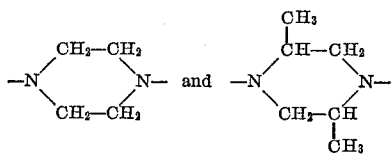

3. The compound of formula:

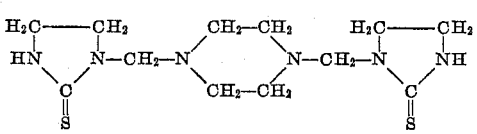

4. The compound of formula:

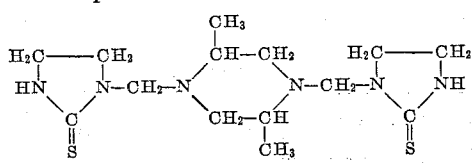

5. The compound of formula:

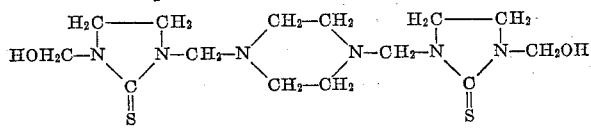

6. A vulcanizable mix comprising a polychloroprene or chloroprene copolymer and, as vulcanization accelerator, at least one compound of the formula

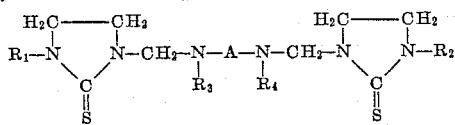

where $R_1$ and $R_2$ are each selected from the class consisting of hydrogen, lower alkyl, cycloalkyl and hydroxymethyl, A represents a saturated hydrocarbon residue, and $R_3$ and $R_4$ are each selected from the class consisting of hydrogen, lower alkyl, and cycloalkyl, and

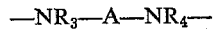

may additionally represent

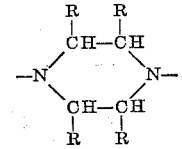

where the R radicals are each selected from the class consisting of hydrogen and methyl.

7. Process for producing a vulcanizate which comprises heating a mix as claimed in claim 6.

No references cited.

JOSEPH L. SCHOFER, *Primary Examiner.*

D. K. DENNENBERG, *Assistant Examiner.*